United States Patent
Johnson et al.

(10) Patent No.: US 9,592,781 B2
(45) Date of Patent: Mar. 14, 2017

(54) SEATBELT TENSION SENSOR PLATE

(71) Applicant: LITTELFUSE, INC., Chicago, IL (US)

(72) Inventors: Brian Johnson, Saltash (GB); Samuel Fuller, Norfolk (GB); Zulqarnain Khan, Chicago, IL (US)

(73) Assignee: LITTELFUSE, INC., Chicago, IL (US)

( * ) Notice: Subject to any disclaimer, the term of this patent is extended or adjusted under 35 U.S.C. 154(b) by 0 days.

(21) Appl. No.: 14/659,887

(22) Filed: Mar. 17, 2015

(65) Prior Publication Data

US 2015/0266440 A1    Sep. 24, 2015

Related U.S. Application Data

(60) Provisional application No. 61/969,482, filed on Mar. 24, 2014.

(51) Int. Cl.
*B60R 21/015*    (2006.01)

(52) U.S. Cl.
CPC ................ *B60R 21/0155* (2014.10)

(58) Field of Classification Search
CPC ......... B60N 2/00; B60R 21/015; G01L 5/103; G01G 19/40; G01G 19/414
USPC ...................... 73/863.391, 862.393
See application file for complete search history.

(56) References Cited

U.S. PATENT DOCUMENTS

| | | | |
|---|---|---|---|
| 4,979,400 A | 12/1990 | Bartholomew | |
| 6,311,571 B1 * | 11/2001 | Norton | G01L 5/10 73/862.637 |
| 6,405,607 B2 * | 6/2002 | Faigle | B60N 2/002 73/862.381 |
| 6,554,318 B2 | 4/2003 | Kohut et al. | |
| 6,732,592 B1 * | 5/2004 | Blackburn | B60R 22/18 73/826 |
| 7,222,545 B2 * | 5/2007 | Blakesley | B60R 22/18 73/862.391 |
| 7,273,231 B2 * | 9/2007 | Stanley | B60R 22/18 280/801.1 |
| 7,347,108 B2 | 3/2008 | Kaijala | |
| 2001/0054323 A1 | 12/2001 | Faigle et al. | |
| 2002/0038573 A1 | 4/2002 | Clark | |
| 2003/0024326 A1 | 2/2003 | Blakesley et al. | |
| 2008/0147125 A1 * | 6/2008 | Colleran | A61B 17/7059 606/280 |

OTHER PUBLICATIONS

International Search Report and Written Opinion mailed Jun. 23, 2015 from corresponding international patent application No. PCT/US2015/021164.

* cited by examiner

*Primary Examiner* — Lisa Caputo
*Assistant Examiner* — Octavia Hollington

(57) ABSTRACT

A plate type tension sensor having apertures, a spring structure, and a gap are provided. The spring structure allows the apertures to move relative to each other as tension is applied to a seat belt to which the plate is attached. The movement changes the width of the gap. The tension applied to a vehicle restraint system may be determined based on the gap width.

15 Claims, 11 Drawing Sheets

900

| | TEST 1 | TEST 2 |
|---|---|---|
| AIR GAP START TEST 1 = 1.001 | | |
| Part subjected to 20 pull-tests of the following values (n): | | |
| 1 | >300 | >300 |
| 2 | >300 | >300 |
| 3 | >300 | >300 |
| 4 | >300 | >300 |
| 5 | >300 | >300 |
| 6 | >300 | >300 |
| 7 | >300 | >300 |
| 8 | >300 | >300 |
| 9 | >300 | >300 |
| 10 | >300 | >300 |
| 11 | >300 | >300 |
| 12 | >300 | >300 |
| 13 | >300 | >300 |
| 14 | >300 | >300 |
| 15 | >300 | >300 |
| 16 | >300 | >300 |
| 17 | >300 | >300 |
| 18 | >300 | >300 |
| 19 | >300 | >300 |
| 20 | >300 | >300 |
| AIR GAP POST PULL-TEST 1 = | 1.056 | |
| AIR GAP POST PULL-TEST 2 = | 1.052 | |

Conclusion
Sample has had 80 pull tests to full extent of travel.
No noticeable shift in airgap has occurred.

```
START
1102
  ↓
PROVIDE A PLATE HAVING A FIRST APERTURE AND A SECOND APERTURE
1104
  ↓
PROVIDE A SPRING STRUCTURE AND A GAP FORMED FROM CUTOUTS IN THE PLATE,
WHEREIN THE FIRST APERTURE AND THE SECOND APERTURE MOVEABLE RELATIVE TO
EACH OTHER AS TENSION IS APPLIED TO THE PLATE
1106
  ↓
PROVIDE A TENSION MODULE CONFIGURED TO DETERMINE THE TENSION APPLIED TO
THE PLATE
1108
  ↓
PROVIDE A SENSOR AND/OR MAGNETIC SYSTEM FOR SENSING AND DETECTING
MOVEMENT OF THE SPRING STRUCTURE AND MEASURING THE GAP
1110
  ↓
END
1112
```

*FIG. 11*

SEATBELT TENSION SENSOR PLATE

CROSS-REFERENCE TO RELATED APPLICATION

This application claims the benefit of U.S. provisional patent application Ser. No. 61/969,482, filed Mar. 24, 2014, entitled "Seatbelt Tension Sensor Plate" the entirety of which is incorporated by reference herein.

FIELD OF THE DISCLOSURE

The disclosure relates generally to the field of vehicle restraint systems and particularly to sensors for vehicle restraint systems.

BACKGROUND OF THE DISCLOSURE

Vehicle restraint systems, also referred to as "seat belts", are used to secure an occupant within a vehicle. Vehicle restraint systems play an important role in reducing injury to occupants during crash situations. Furthermore, vehicle restraint systems are often mandated by various regulatory and licensing agencies. A common vehicle restraint system includes a lap belt and a shoulder belt. Typically, the lap belt and the shoulder belt are connected together at one end and include a latch plate. The other end of the shoulder belt and lap belt is connected to the vehicle structure. A buckle configured to receive the latch plate is also connected to the vehicle structure. When the buckle and the latch plate are connected (e.g., across an occupant's shoulder and waist), the vehicle restraint system may operate to restrain movement of the occupant during a collision.

Modern vehicles often incorporate inflatable systems, also referred to as "air bags", to further reduce potential injury during a crash situation. Sensors can be incorporated into the vehicle restraint system to determine when to deploy the inflatable systems. For example, sensors may be implemented in the vehicle restraint system to determine if an occupant is in a seat of the vehicle. Deployment of the inflatable system can depend on information supplied by the sensors. Furthermore, the sensors may be used to determine whether the seat includes an adult occupant or a child occupant. As it is undesirable to deploy air bags when the occupant is a child, the sensors may be used to determine whether to deploy the air bags or not. However, when a child seat with a child occupant is placed in a seat and secured in place by the vehicle restraint system, the sensors in the seat may read a large mass indicative of an adult occupant. In this scenario, however, there will be high tension in the seat belt. Studies have shown that adult occupants do not wear their seat belts as tightly as child seats are secured. Accordingly, determination of whether the seat includes an adult occupant or a child occupant in a child seat may be made based on a tension of the seat belt.

Accordingly, it is desirable to provide an assembly for sensing tension in a seat restraint system of a vehicle. It is with respect to the above that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In accordance with the present disclosure, a seat tension sensor is provided. In particular, a plate type tension sensor having apertures, a spring structure, and a gap are provided. The spring structure allows the apertures to move relative to each other as tension is applied to a seat belt to which the plate is attached. The movement changes the width of the gap. The tension applied to a vehicle restraint system may be determined based on the gap width.

BRIEF DESCRIPTION OF THE DRAWINGS

FIG. 9 is an example of pull-test testing data for a plate for the plate type tension sensor of FIGS. 1-2 in accordance with the present disclosure.

FIG. 11 is a flow chart of an additional method of manufacturing the plate type tension sensor of FIGS. 1-2 in accordance with the present disclosure.

DETAILED DESCRIPTION

Figure 1:
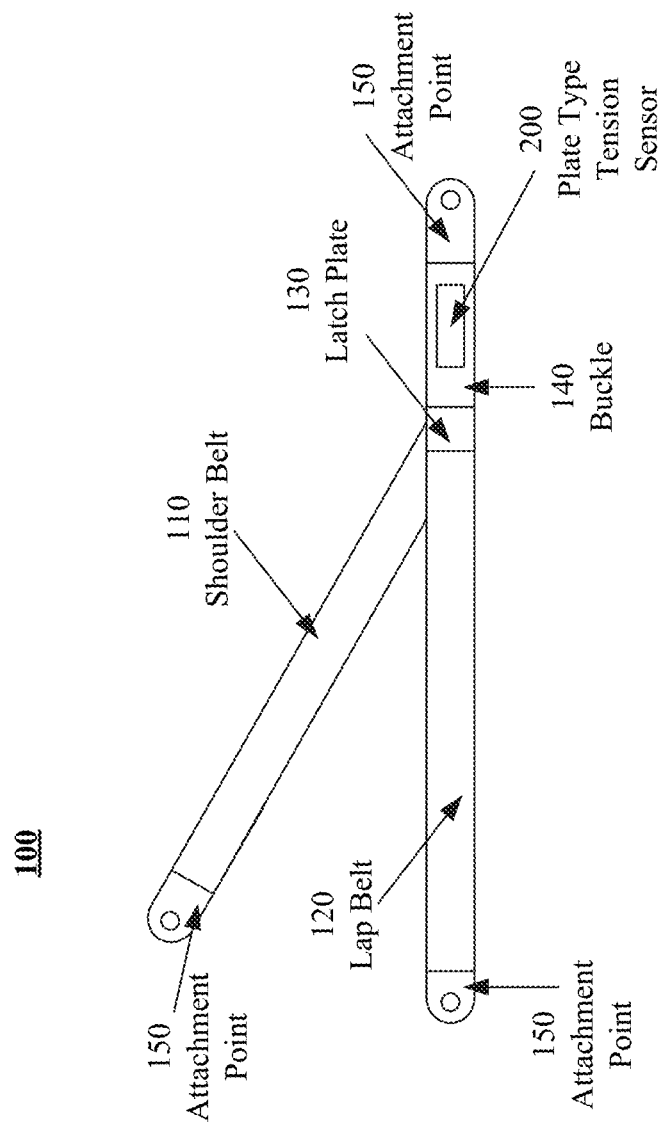
FIG. 1 is a block diagram illustrating a vehicle restraint system including a plate type tension sensor in accordance with the present disclosure.

Examples are now described more fully hereinafter with reference to the accompanying drawings, in which illustrative embodiments of the present disclosure are shown. The present disclosure, however, may be embodied in many different forms and should not be construed as being limited to the embodiments set forth herein. Rather, these embodiments are provided so that this disclosure will be thorough and complete, and will fully convey the scope of the claimed subject matter. In the drawings, like numbers refer to like elements throughout.

In general, the present disclosure provides a plate type tension sensor for a vehicle restraint system. More specifically, the present disclosure provides a plate and apparatus for sensing tension in a seat belt. The tension may then be used to determine whether the seat belt is fastened, whether the seat belt is fastened over an adult or a child occupant, whether the seat belt is fastened over a child seat, or the like.

FIG. 1 is a block diagram of an example vehicle restraint system 100. The vehicle restraint system 100 may be implemented in a vehicle. In particular, the vehicle restraint system 100 may be implemented in a vehicle along with one or more inflatable restraints. The deployment of the inflatable restraint systems may be determined based on output from the sensor (described in greater detail below) in the vehicle restraint system 100. In particular, the sensor may be used to determine the tension of the vehicle restraint system and may be used to determine whether an occupant in the vehicle is an adult, a child, and/or a child in a child seat.

The vehicle restraint system 100 includes a shoulder belt 110, a lap belt 120, and a latch plate 130. The shoulder belt 110 and the lap belt 120 are connected to the latch plate 130. That is, the shoulder belt 110 and the lap belt 120 may be connected together at one end and coupled to the latch plate 130. The vehicle restraint system 100 further includes a buckle 140. The buckle 140 is configured to receive the latch plate 130. Said differently, the latch plate 130 may be inserted into the buckle 140 and secured therein to restrain the shoulder belt 110 and the lap belt 120 (e.g., in the event of a collision, in the event of braking, or the like).

Each of the shoulder belt 110, the lap belt 120, and the buckle 140 includes an attachment point, such as the shoulder belt attachment point 150 and the lap belt attachment point 150. The attachment points, such as the shoulder belt attachment point 150 and the lap belt attachment point 150 may be used to secure the other ends of the shoulder belt 110, the lap belt 120 and the buckle 140 to the vehicle structure (not shown).

The buckle 140 further includes a plate type tension sensor 200. The sensor 200 is depicted included in the buckle 140. However, this is done for illustrative purposes only and is not intended to be limiting. Some examples may include the sensor 200 separate from the buckle 140. For example, the sensor 200 may be attached between the buckle 140 and the buckle attachment point 150. As another example, multiple sensors may be implemented, for example, a first sensor 200 may be included between the shoulder belt attachment point 150 and a second sensor 200 may be included between the lap belt attachment point 150. Furthermore, it is important to note, that the vehicle restraint system 100 is merely illustrative and may include only a lap belt 120 or only a shoulder belt 110. Furthermore, other configurations (e.g., 5 point harness, or the like) may be implemented with the plate type tension sensor 200 described herein. Furthermore, the vehicle restraint system 100 may be implemented in any type of vehicle (e.g., automotive, marine, aircraft, or the like). Additionally, the vehicle restraint system 100 may be implemented in one or more seats (front seat, back seat, driver seat, passenger seat, middle seat, or the like) within a vehicle.

Figure 2:
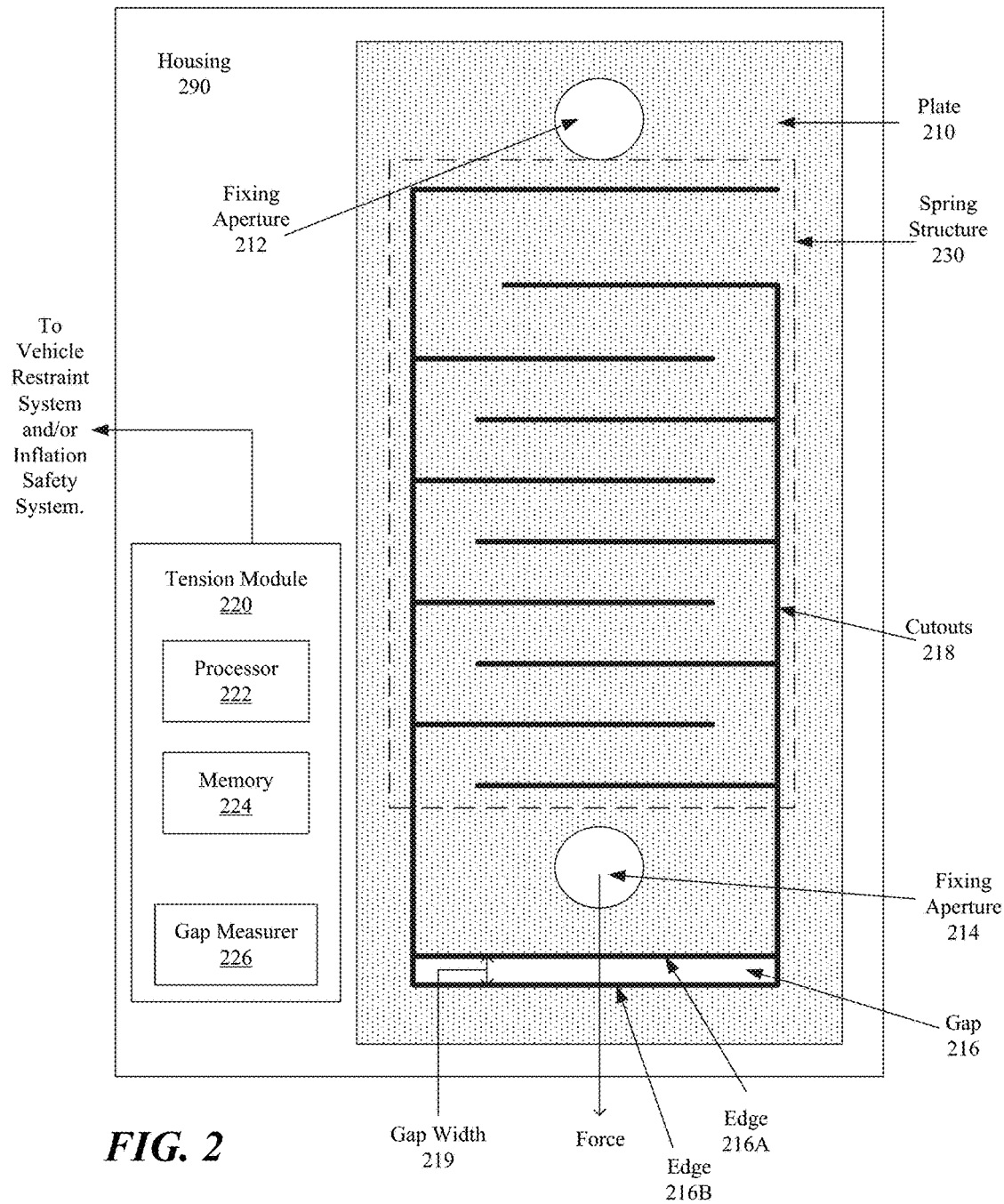
FIG. 2 is block diagram of the plate type tension sensor of FIG. 1 in accordance with the present disclosure.

FIG. 2 illustrates a block diagram of the plate type tension sensor 200. The plate type tension sensor 200 shown in FIG. 2 is described with reference to the vehicle restraint system 100 of FIG. 1. However this is not intended to be limiting and the plate type tension sensor 200 may be implemented to determine tension within a vehicle restraint system different than the vehicle restraint system shown in FIG. 1.

Turning more specifically to FIG. 2, the sensor 200 includes a plate 210 and a tension module 220 enclosed in a housing 290. In some examples, sensor 200 may not be enclosed within a housing. For example, the plate 210 and the tension module 220 may be disposed in the vehicle restraint system 100 but not enclosed within a housing. Furthermore, the housing 290 may be formed from a variety of materials and may be included to house only portions of the sensor 200. For example, the plate 210 and the tension module 220 may be enclosed within the housing while the ends of the plate 210 protrude from the housing to be attached to the vehicle restraint system.

The plate 210 includes a first fixing aperture 212, a second fixing aperture 214, a gap 216, and cutouts 218. The plate 210 may be formed from a variety of materials (e.g., steel, steel alloys, aluminum, or the like). In general, the plate 210 may be formed from a material of sufficient strength and integrity to withstand the tension that the vehicle restraint system 100 might encounter during use (e.g., in normal operation, in a crash situation, or the like). Furthermore, the plate 210 may be formed from a single piece of material. Said differently, the plate 210 may be manufactured (e.g., stamped, cut, formed, or the like) from a single piece of material, thereby reducing part count and simplifying manufacture.

The first and second fixing apertures 212, 214 are provided to attach the sensor 200 to the vehicle restraint system 100. For example, one of the first and second fixing apertures 212, 214 can be used to secure the sensor 200 to an end of the shoulder belt 110, and/or the buckle 140 while the other one of the first and second fixing apertures 212, 214 can be used to secure the sensor 200 to the vehicle structure. As another example, the first and second fixing apertures 212, 214 can be used to secure the sensor 200 between either the shoulder belt attachment point 150 and/or the lap belt attachment point 150 and one of the shoulder belt 110, the lap belt 120, and/or the buckle 140.

The cutouts 218 allow the first and second fixing apertures 212, 214 to move relative to each other. More specifically, when force is applied to the first and second fixing apertures 212, 214, they may move apart from each other. For example, assume that the first fixing aperture 212 is fixed in place (e.g., secured to the vehicle structure, or the like) and the second fixing aperture 214 is secured to the shoulder belt. As the shoulder belt is tightened, force may be applied (e.g., in the direction shown in FIG. 2) which acts to pull the apertures, such as the first and second fixing apertures 212, 214, apart from each other. Accordingly, edge 216A may move into the gap 216, thereby reducing the gap width 219.

The tension module 220 may be configured to determine the tension applied to the vehicle restraint system 100. For example, the tension module 220 can be configured for determining an amount of tension applied to one of the first and second fixing apertures 212, 214 based at least in part upon a gap width 219 of the gap 216 in relation to movement of the first and second fixing apertures 212, 214 relative to each other. The tension module 220 includes a processor 222, a memory 224, and a gap measurer 226. In general, the gap measurer 226 is configured to measure the gap width 219. The gap width 219 may be defined as the width between edge 216A and edge 216B. The processor may be a general purpose processor, a microprocessor, an FPGA, an ASIC, or in general, any computing device configured to execute instructions. The memory may be a computer readable medium, including non-volatile computer readable medium and/or non-transient computer readable medium configured to store computer executable instructions, that when executed by the processor 222, cause the processor to perform one or more operations. In particular, the memory 224 may store one or more instructions that when executed by the processor 222 cause the processor 222 to determine the tension applied to the sensor 200. For example, the instructions may cause the processor 222 to receive a gap width measurement of the gap width 219 from the gap measurer 226, determine a tension based on the gap width measurement of the gap width 219, and provide the tension to a vehicle restraint system controller and/or an inflation safety system controller.

In some examples, the gap measurer 226 may be a magnetic measurement device. In some examples, the gap measurer 226 may be an inductive measurement device. In some examples, the gap measurer 226 may be an optical measurement device. During operation, as force is applied to the sensor 200 (e.g., in particular, the plate 210) the gap measurer 226 may measure the gap width 219. As the force applied changes, the gap width 219 may change. Accordingly, the gap measurer 226 may repeatedly (e.g., at set intervals, as requested by the processor 222, randomly, or the like) measure the gap width 219.

As depicted, the cutouts 218 form a "spring structure" 230. The spring structure 230 allows the apertures 212, 214 to move (e.g., open and close) as tension is applied to a seat belt (e.g., the shoulder belt 110, the lap belt 120, or the like) to which the sensor 200 and/or the plate 210 are attached. Portions of the plate 210 may be removed (e.g., by stamping, by cutting, by EDM machining, or the like) to form the gap 216 and the spring structure 230. As noted, the spring structure 230 allows movement of the apertures relative to each other. This movement may be dependent upon the amount of force applied to the apertures, such as the first and second fixing apertures 212, 214. This force may translate to a tension in the vehicle restraint system to which the plate type tension sensor 200 is mounted. The gap width 219 can be measured to determine the force and/or tension. Furthermore, a tension limit can be manufactured into the sensor (e.g., by limiting the gap width 219). Accordingly, once the maximum tension is applied (e.g., the gap width 219 is substantially zero) the gap 216 will be closed and the edge 216A will be supported by the edge 216B. In one embodiment, the edge 216A and the edge 216B are coplanar. As such, the edge 216A may be face-to-face with the edge 216B while being supported.

Figure 3:
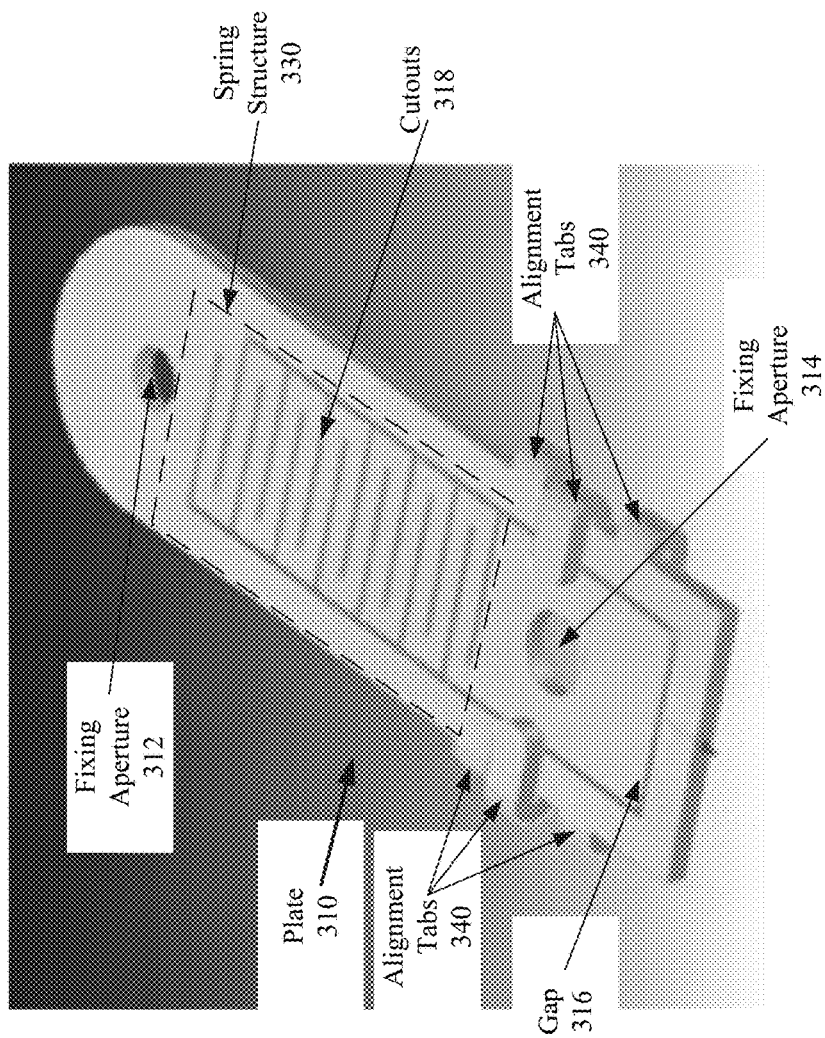
FIGS. 3-4 are perspective views of examples of a plate for the plate type tension sensor of FIGS. 1-2 in accordance with the present disclosure.
Figure 4:
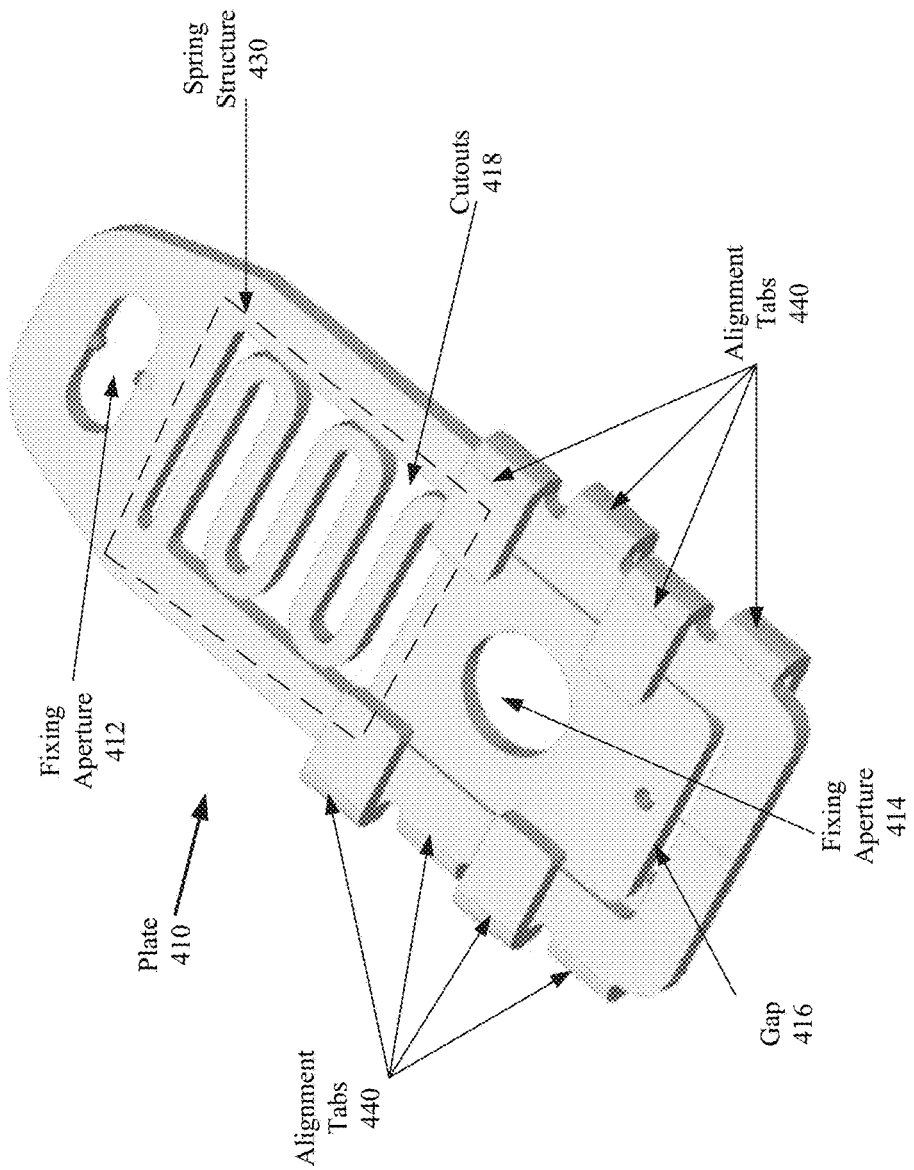

FIGS. 3-4 illustrate examples of the plate 210. In particular, FIGS. 3-4 illustrate perspective views of example embodiments 310 and 410, respectively, of the plate 210. It is to be appreciated, that these examples are provided for illustration only and are not intended to be limiting. Either of the plates 310 and/or 410 as well as equivalent plates not shown herein may be substituted for the plate 210 shown in FIG. 2.

Turning more specifically to FIG. 3, an example plate 310 is shown. The plate 310 includes fixing apertures 312 and 314. A gap 316 is also shown. The plate 310 also has cutouts 318 therein. The cutouts 318 allow the fixing apertures 312 and 314 to move relative to each other as force is applied to either of the fixing apertures 312 and 314. In particular, the cutouts 318 allow the fixing aperture 314 to move away from the fixing aperture 312 to reduce the width of the gap 316.

As depicted, the cutouts 318 form a "spring structure" 330. The spring structure 330 allows the fixing apertures 312 and 314 to move (e.g., open and close) as tension is applied to a seat belt (e.g., the shoulder belt 110, the lap belt 120, or the like) to which the plate 310 is attached.

The plate 310 further includes alignment tabs 340. The alignment tabs 340 are depicted bent about the edges of the plate 310 to keep the moveable portion of the plate 310 (e.g., the portion adjacent to the aperture 314) aligned with the other portion of the plate 310.

Turning more specifically to FIG. 4, an example plate 410 is shown. The plate 410 includes fixing apertures 412 and 414. A gap 416 is also shown. The plate 410 also has cutouts 418 therein. The cutouts 418 allow the fixing apertures 412 and 414 to move relative to each other as force is applied to either of the apertures. In particular, the cutouts 418 allow the fixing aperture 414 to move away from the fixing aperture 412 to reduce the width of the gap 416.

As depicted, the cutouts 418 form a "spring structure" 430. The spring structure 430 allows the apertures 412, 414 to move (e.g., open and close) as tension is applied to a seat belt (e.g., the shoulder belt 110, the lap belt 120, or the like) to which the plate 410 is attached.

The plate 410 further includes alignment tabs 440. The alignment tabs 440 are depicted bent about the edges of the plate 410 to keep the moveable portion of the plate 410 (e.g., the portion adjacent to the aperture 414) aligned with the other portion of the plate 410.

Figure 5:
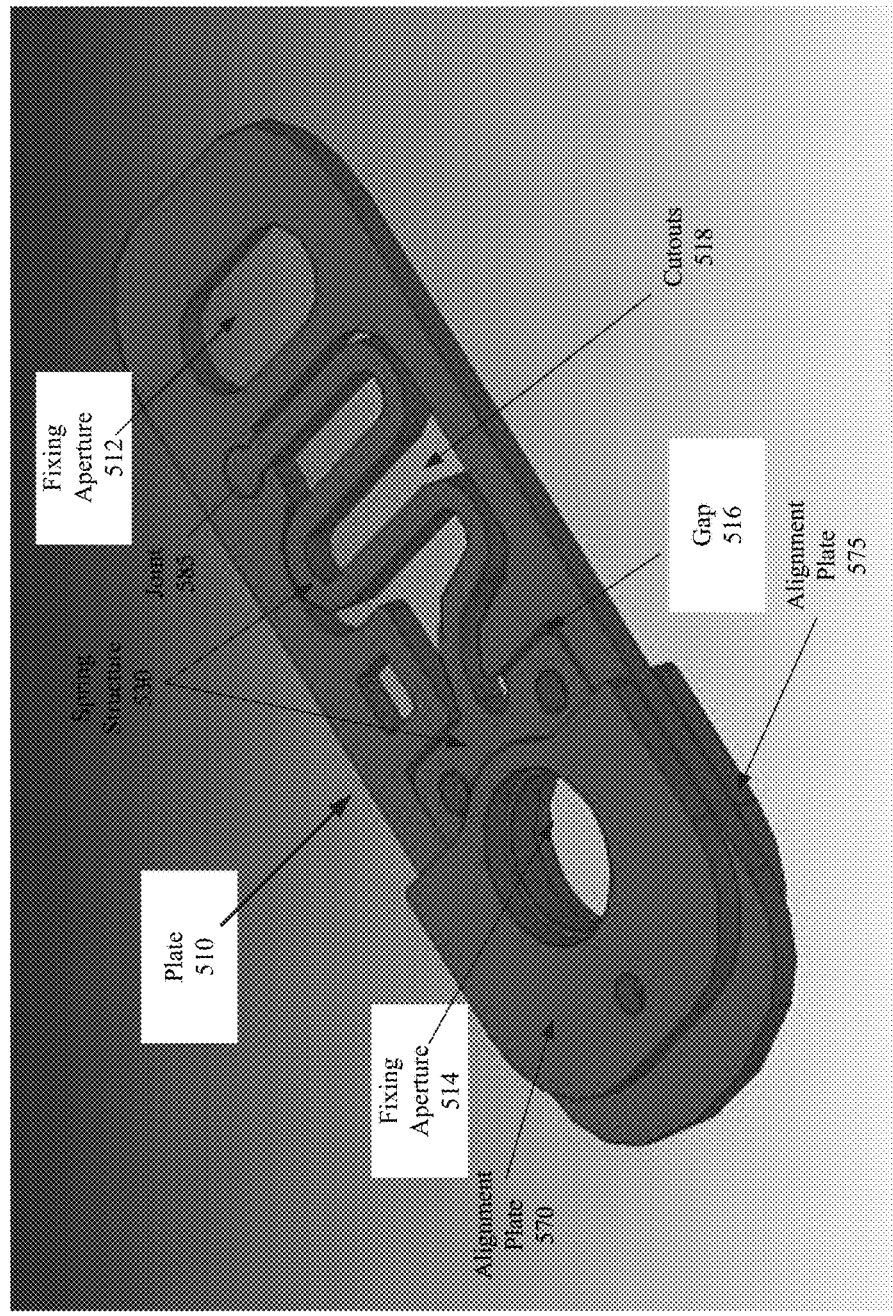
FIG. 5 is a perspective view of an additional example of a plate for the plate type tension sensor of FIGS. 1-2 in accordance with the present disclosure.

FIG. 5 illustrates an example of the plate 510. In particular, FIG. 5 illustrates an example of plate 510 similar to FIGS. 3 and 4. The plate 510 includes fixing apertures 512 and 514. Alignment plates 570, 575 are also shown. A gap 516 is also shown. The plate 510 also has cutouts 518 therein.

The cutouts 518 allow the fixing apertures 512 and 514 to move relative to each other as force is applied to either of the fixing apertures 512 and 514. In particular, the cutouts 518 allow the fixing aperture 514 to move away from the fixing aperture 512 to reduce the width of the gap 516. It should be noted that in one embodiment, cutouts 518 can be formed (e.g., cutout) from plate 510. In an alternative embodiment, cutouts 518 can be formed (e.g., cutout) from an alternative plate having one of a variety of materials (e.g., steel, steel alloys, aluminum, or the like) and having a greater strength and/or thickness as compared to plate 510. The cutouts 518 formed (e.g., cutout) from the alternative plate can then be coupled to the plate 510 at joint 585. That is, cutouts 518 formed from the alternative plate can then be welded to the plate 510 at joint 585. The cutouts 518 formed from the alternative plate and welded to the plate 510 provide for additional strength and durability for plate 510.

As depicted, the cutouts 518 form the spring structure 530. The spring structure 530 allows the fixing apertures 512 and 514 to move (e.g., open and close) as tension is applied to a seat belt (e.g., the shoulder belt 110, the lap belt 120, or the like) to which the plate 510 is attached.

The alignment plates 570, 575 are depicted as having apertures defined therein with the plate 510 received between the alignment plates 570, 575. The fixing aperture 514 is centered with the apertures defined in each of the alignment plates 570, 575. That is, alignment plate 570 is coupled to one side of the plate 510, such as a top side, and alignment plate 575 is coupled to an opposite side of the plate 510, such as a bottom side, with the alignment plates 570, 575 positioned such that fixing aperture 514 and the apertures defined in each of the alignment plates 570, 575 are aligned with the fixing aperture 514. In one embodiment, the alignment plates 570, 575 are both coupled to the fixing aperture 514 and simultaneously move away from the fixing aperture 512 to reduce the width of the gap 516. That is, the alignment plates 570, 575 along with the fixing apertures 512 and 514 move together (e.g., open and close) as tension is applied to a seat belt (e.g., the shoulder belt 110, the lap belt 120, or the like) to which the plate 510 is attached.

The alignment plates 570, 575 keep the moveable portion of the plate 510 (e.g., the spring structure 530) aligned with the other portion of the plate 510. That is, the alignment plates 570, 575 keep the spring structure 530 aligned with the other portion of the plate 510, such as in a coplanar arrangement.

Figure 6:
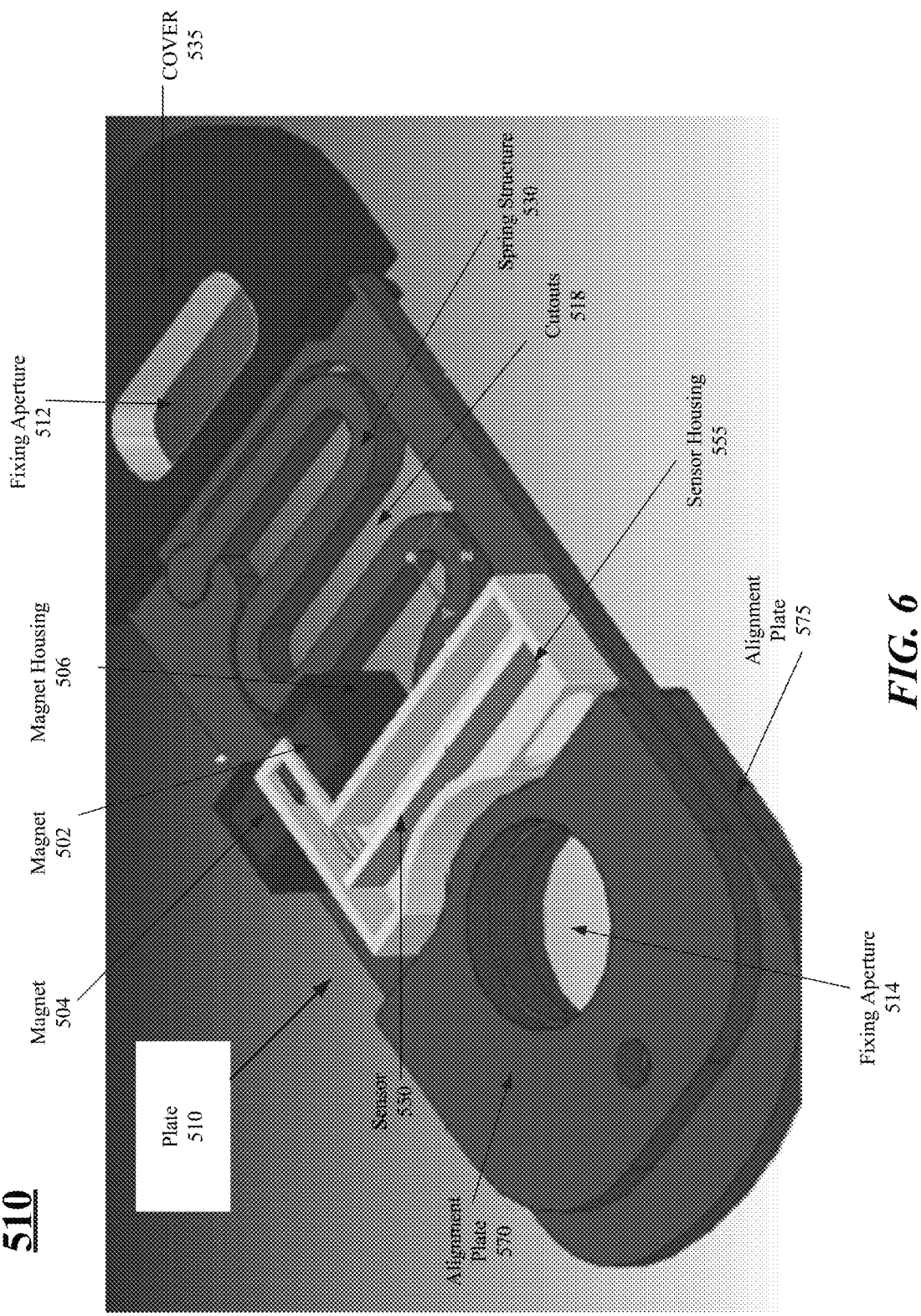
FIG. 6 is a perspective view of a sensor and magnetic system of the plate of FIG. 5 for the plate type tension sensor of FIGS. 1-2 in accordance with the present disclosure.

FIG. 6 is a perspective view of a sensor and magnetic system of the plate of FIG. 5 for the plate type tension sensor of FIGS. 1-2 in accordance with the present disclosure. The plate 510 includes a magnet housing 506, magnets 502, 504, a sensor housing 555, a sensor 550, and a cover 535. The sensor 550 and the magnets 502, 504 may be disposed on and coupled to the plate 510. The magnets 502, 504 can be housed within the magnet housing 506, which can be coupled to the plate 510.

The sensor 550 can be housed within the sensor housing 555 with a portion of the sensor 550 disposed between magnets 502, 504. The sensor 550 and the magnets 502, 504 can operate using a Hall effect. The sensor 550 and the magnets 502, 504 are arranged or operated in such a manner as to develop a non-uniform magnetic field (e.g., the magnetic field varies in a periodic manner) and this magnetic field variation will produce a corresponding variation in the potential difference that is induced in the conductors according to the Hall-effect. Sensor 550 can detect variations in the magnetic field experienced by the individual sensing elements of sensor 550 (e.g., current-carrying conductor) and can be constructed based upon this Hall-effect phenomenon. Accordingly, using the Hall-effect, the sensor 550 and the magnets 502, 504 assist to determine the tension applied to the plate type tension sensor based at least in part upon a width of the gap 516. That is, the sensor 550 along with the magnets 502, 504 can be configured for sensing and/or detecting movement of the spring structure and measuring the gap 516. The sensor 550 and the magnets 502, 504 may be considered as a magnetic measurement device (e.g., a gap measurer). The sensor 550 can also work in conjunction with tension module 220, processor 222, memory 224, and/or gap measurer 226 of the sensor 200 in FIG. 2.

In one embodiment, the sensor 550 detects the relative movement between the fixing aperture 514 and the magnets 502, 504. The gap 516 (e.g., an air gap) itself is not directly measured. The sensor 550 can be rigidly mounted to one end of the spring structure 530 so the relative movement between the sensor 550 and the magnets 502, 504 is the same as the movement at the gap 516. In one embodiment, the spring structure 530 includes a spring plate on one end and coupled to the sensor 550.

In one embodiment, the sensor 550 measures movement while the plate 510 is pulled. That is, the fixing apertures 512 and 514 and the magnets 502, 504 move relative to the sensor 550 and the change in movement and/or distance between the fixing apertures 512 and 514 and the magnets 502, 504 is measured and translated into an amount of tension/force applied.

Figure 7:
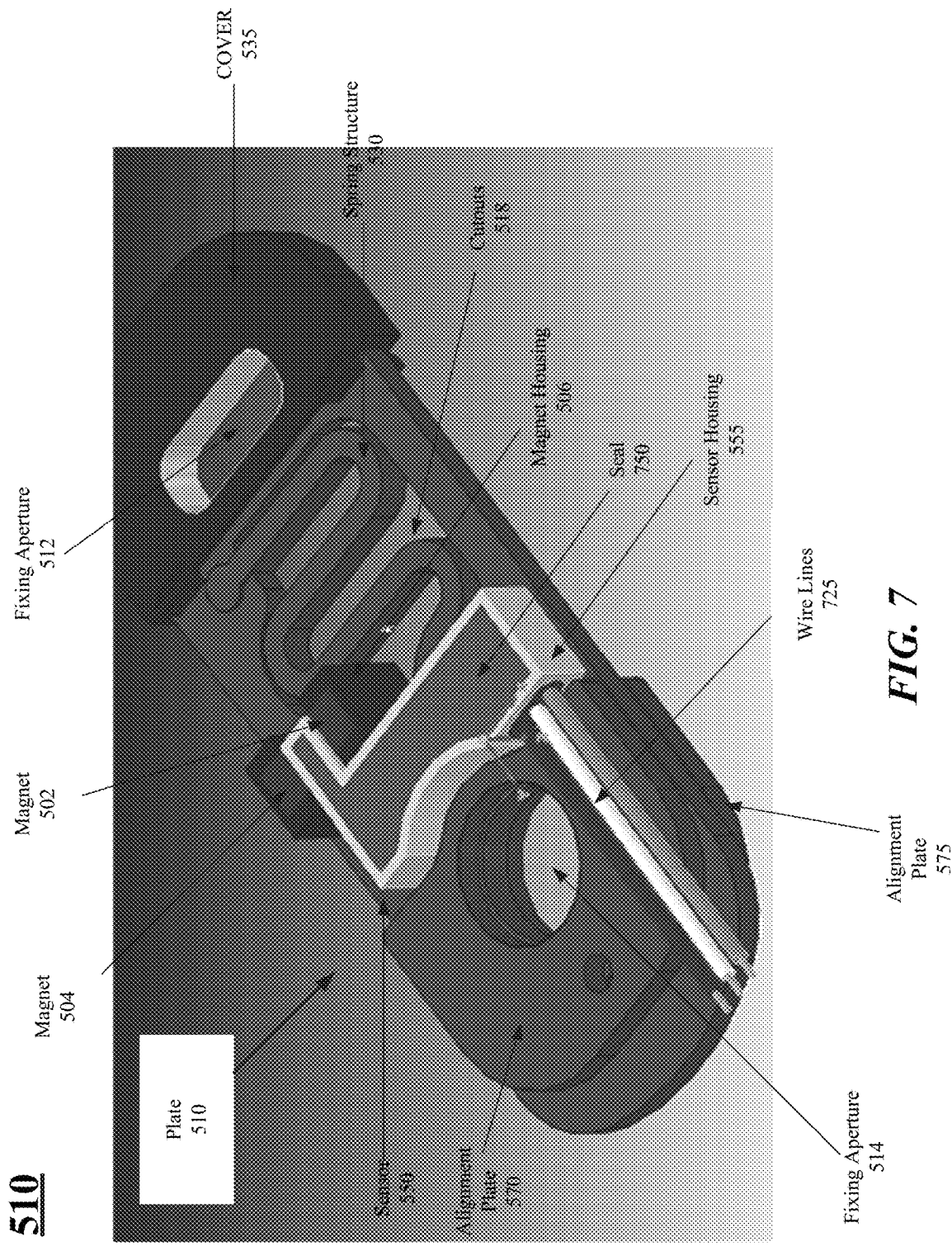
FIG. 7 is a perspective view of a seal covering the sensor of the plate of FIG. 5 for the plate type tension sensor of FIGS. 1-2 in accordance with the present disclosure.

FIG. 7 is a perspective view of a seal covering the sensor of the plate of FIG. 5 for the plate type tension sensor of FIGS. 1-2 in accordance with the present disclosure. The sensor housing 555 can be filed filled with a potting material (e.g., an epoxy) and sealed with a seal 750. Wire lines 725 provide input/output lines for electrically coupling the sensor 550 to a termination device and/or power source, such as a tension module 220 of FIG. 2.

Figure 8:
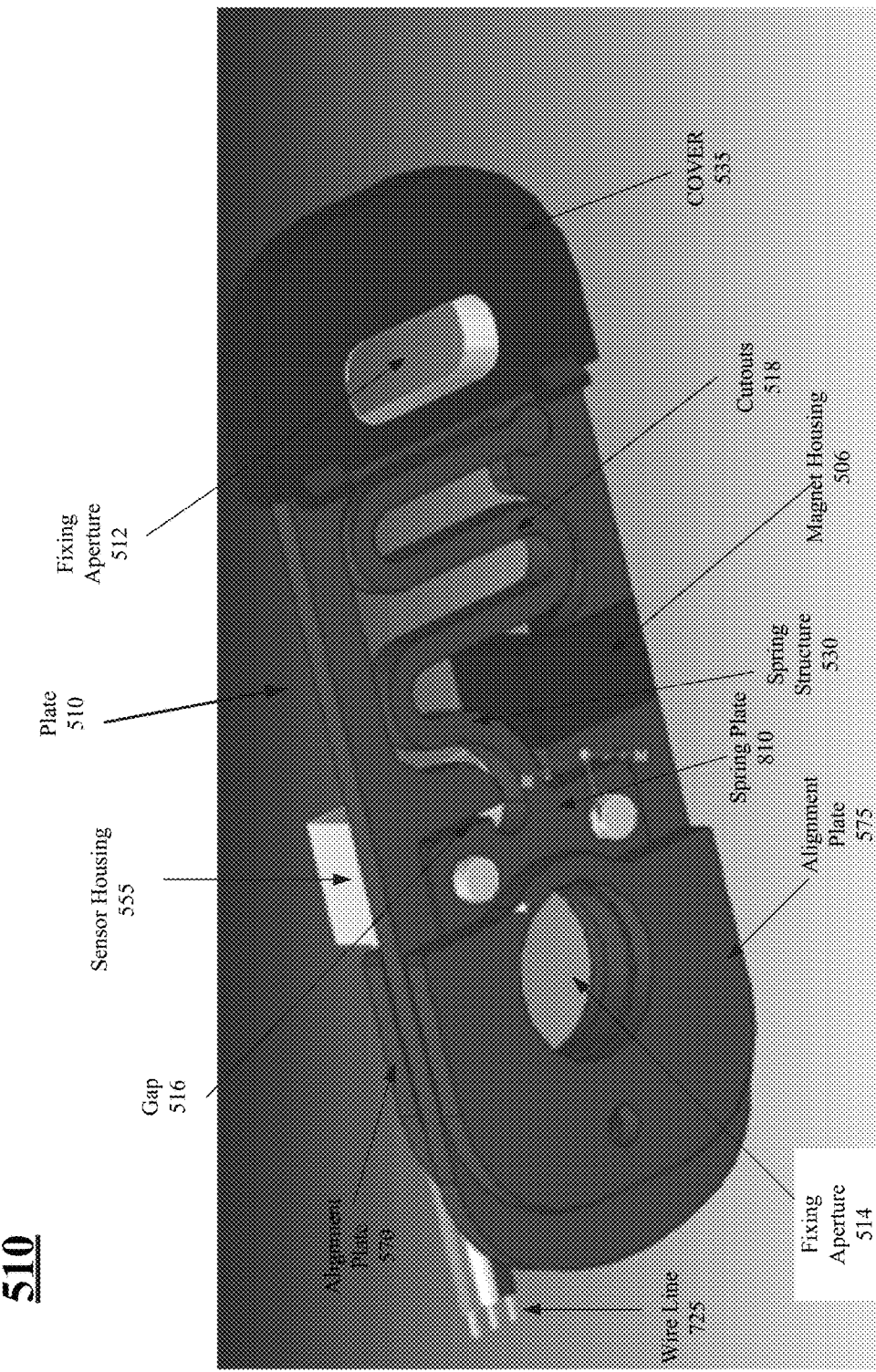
FIG. 8 is a bottom view of the plate of FIG. 5 for the plate type tension sensor of FIGS. 1-2 in accordance with the present disclosure.

FIG. 8 is a bottom view of the plate 510 of FIG. 5 for the plate type tension sensor of FIGS. 1-2 in accordance with the present disclosure. As further shown in FIG. 8, the sensor housing 555 can be coupled to the plate 510. More specifically, the sensor housing 555 can be coupled to a portion of the spring structure 530 via one of a variety of securing means, such as, for example, pegs or pins inserted through a portion of the spring structure 530 and/or secured via an adhesive substance, a snap-fit attachment mechanism, solder, and/or other means for securement. In one embodiment, the spring structure 530 may also includes a spring plate 810 on one end and coupled to the sensor 550.

FIG. 9 is an example of data obtained from subjecting plate 510 of FIG. 5 to a pull-test in accordance with the present disclosure. The pull-test consisted of setting up plate 510 on a tensile testing machine and pulling the plate 510 to measure the air gap. The fixing aperture 512 of plate 510 was attached to a moving part of the tensile testing machine through a force meter. Fixing aperture 514 of plate 510 was attached to the tensile testing machine base plate. The plate 510 was then subjected to 40 pull tests with a minimum of 300 Newtons (N) force. The air gap was measured before and after each test. The plate 510 was subjected to 40 pull tests to the full extent of travel. The testing revealed that there was no noticeable occurrence of a shift in the air gap.

That is, the plate 510 was subjected to test 1 and test 2 with each test having 20 pull tests (1-20) with a minimum of 300 N force. At the start of the first test of both test 1 and test 2, the air gap measured substantially 1.001 millimeters (mm). At the end of the 20 pull tests of test 1, the air gap measured substantially 1.056 mm. At the end of the 20 pull tests of test 2, the air gap measured substantially 1.052 mm. Both test 1 and test 2 were repeated with similar results occurring for a total of 80 cycle sample test pulls to the plate 510 for sensing the movement of the air gap. Thus, as observed, only a slight shift (e.g., around 0.055 mm) occurred to the air gap.

Figure 10:
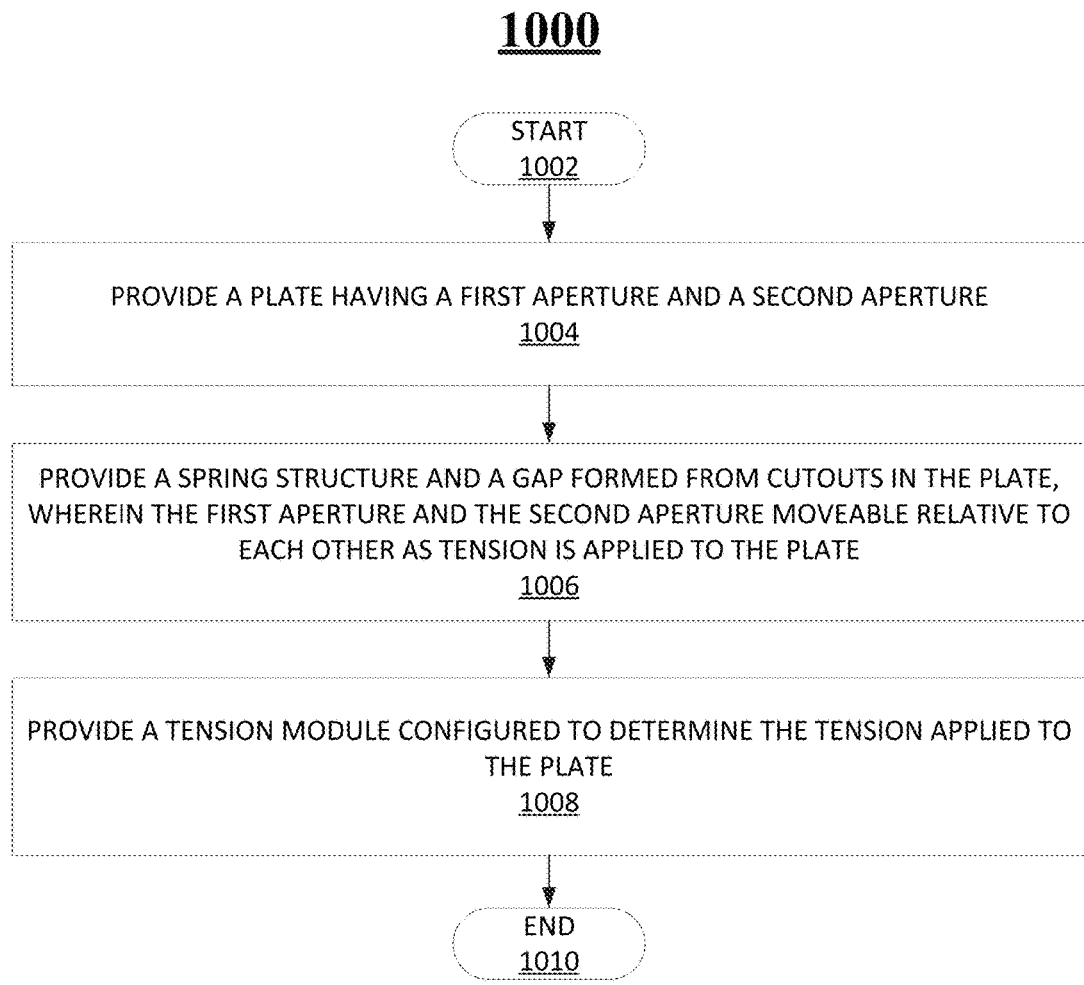
FIG. 10 is a flow chart of a method of manufacturing the plate type tension sensor of FIGS. 1-2 in accordance with the present disclosure.

FIG. 10 is a flow diagram of a method of manufacturing 1000 a plate type tension sensor of FIGS. 1-2 in accordance with the present disclosure. The method of manufacturing 1000 can be used to manufacture or assemble the plate type tension sensor or modules described herein. The method of manufacturing 1000 begins at block 1002. The method of manufacturing 1000 moves to block 1004. At block 1004, the method of manufacturing 1000 provides a plate having a first aperture and a second aperture. At block 1006, the method of manufacturing 1000 provides a spring structure and a gap formed from cutouts in the plate. In one embodiment, the cutouts could be manufactured from an alternative, thicker plate, as compared to the plate having the first and second aperture, and then welded to the plate having the first and second aperture. The first aperture and the second aperture moveable relative to each other as tension is applied to the plate. At block 1008, the method of manufacturing 1000 provides a tension module configured to determine the tension applied to plate. The method of manufacturing can end at block 1010.

FIG. 11 is a flow diagram of an additional method of manufacturing 1100 a plate type tension sensor of FIGS. 1-2 in accordance with the present disclosure. The method of manufacturing 1100 can be used to manufacture or assemble the plate type tension sensor or modules described herein. The method of manufacturing 1100 begins at block 1102. The method of manufacturing 1100 moves to block 1104. At block 1104, the method of manufacturing 1100 provides a plate having a first aperture and a second aperture. At block 1106, the method of manufacturing 1100 provides a spring structure and a gap formed from cutouts in the plate. The first aperture and the second aperture moveable relative to each other as tension is applied to the plate. At block 1108, the method of manufacturing 1100 provides a tension module configured to determine the tension applied to plate. At block 1110, the method of manufacturing 1100 provides a sensor and/or magnetic system for sensing and/or detecting movement of the spring structure and measuring a gap. The method of manufacturing can end at block 1112.

Accordingly, a plate type tension sensor, formed from a single plate, is provided. In particular, a tension sensor for a vehicle having few moving parts is provided. The disclosed tension sensor may be more robust and more cost effective sensor than conventional tension sensors.

As used herein, references to "an embodiment," "an implementation," "an example," and/or equivalents is not intended to be interpreted as excluding the existence of additional embodiments that also incorporate the recited features.

While the present disclosure has been made with reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A plate type tension sensor for a vehicle restraint system comprising:
   a first plate having a first aperture;
   a second plate having cutouts defining a second aperture and a spring structure, the second plate coupled to the first plate to define a gap therebetween, the first aperture and the second aperture moveable relative to each other; and
   a tension module configured to determine the tension applied to the plate type tension sensor based at least in part upon a width of the gap; and wherein one of the first aperture and the second aperture is configured to secure the plate to a vehicle structure or a vehicle restraining device.

2. The plate type tension sensor of claim 1, wherein the first plate is formed from a single piece of material.

3. The plate type tension sensor of claim 1, further including a housing, wherein the first plate, the second plate, and the tension module are enclosed within the housing.

4. The plate type tension sensor of claim 1, wherein the cutouts are configured to allow the first aperture to move towards or away from the second aperture.

5. The plate type tension sensor of claim 1, wherein the spring structure extends between the first aperture and the second aperture.

6. The plate type tension sensor of claim 1, wherein the spring structure is configured to allow the first aperture and the second aperture to be moveable relative to each other as tension is applied to or removed from the plate.

7. The plate type tension sensor of claim 1, wherein the first plate includes a first edge and the second plate includes a second edge, the first edge and the second edge defining the gap.

8. The plate type tension sensor of claim 7, wherein the first edge and the second edge are coplanar.

9. The plate type tension sensor of claim 1, wherein the tension module further includes a gap measurer and a processor, wherein the gap measurer is a magnetic measurement device.

10. The plate type tension sensor of claim 9, wherein the gap measurer measures the width of the gap.

11. The plate type tension sensor of claim 10, wherein the gap measurer determines the tension applied to the plate type tension sensor by measuring the width of the gap.

12. The plate type tension sensor of claim 1, wherein the tension module includes maximum tension limit of the plate.

13. The plate type tension sensor of claim 1, further including alignment tabs coupled to at least one of the first plate and the second plate.

14. The plate type tension sensor of claim 1, wherein the first plate is formed of a first material and the second plate is formed of a second material, the second material being different than the first material.

15. The plate type tension sensor of claim 1, wherein the first plate has a first thickness and the second plate has a second thickness, the second thickness being different than the first thickness.

* * * * *